US010171351B2

(12) United States Patent
Ahn et al.

(10) Patent No.: US 10,171,351 B2
(45) Date of Patent: Jan. 1, 2019

(54) METHOD FOR UPDATING FLOW TABLE (71) Applicant: KT Corporation, Seongnam-si, Gyeonggi-do (KR)

(72) Inventors: Tae Jin Ahn, Daejeon (KR); Kyoung Youl Kim, Daejeon (KR); Se Hui Lee, Daejeon (KR); Kyung Ah Han, Daejeon (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 15/025,084

(22) PCT Filed: Sep. 23, 2014

(86) PCT No.: PCT/KR2014/008837
§ 371 (c)(1),
(2) Date: Mar. 25, 2016

(87) PCT Pub. No.: WO2015/046859
PCT Pub. Date: Apr. 2, 2015

(65) Prior Publication Data
US 2016/0241485 A1    Aug. 18, 2016

(30) Foreign Application Priority Data

Sep. 26, 2013 (KR) .......................... 10-2013-0114764
Sep. 22, 2014 (KR) .......................... 10-2014-0125933

(51) Int. Cl.
*H04L 12/721* (2013.01)
*H04L 12/741* (2013.01)
*H04L 12/751* (2013.01)

(52) U.S. Cl.
CPC .............. *H04L 45/38* (2013.01); *H04L 45/02* (2013.01); *H04L 45/745* (2013.01)

(58) Field of Classification Search
CPC ........ H04L 45/02; H04L 45/38; H04L 45/745
See application file for complete search history.

(56) References Cited

U.S. PATENT DOCUMENTS

| 8,107,380 B1* | 1/2012 | Schaff | ................ H04L 43/0876 370/238 |
|---|---|---|---|
| 2004/0032625 A1* | 2/2004 | Yamano | .............. H04L 41/0213 358/405 |

(Continued)

FOREIGN PATENT DOCUMENTS

| KR | 10-2002-0053668 A | 7/2002 |
|---|---|---|
| WO | 2012/127894 A1 | 9/2012 |

OTHER PUBLICATIONS

International Search Report of PCT/KR2014/008837, dated Jan. 8, 2015. [PCT/ISA/210].

(Continued)

*Primary Examiner* — Kan Yuen
(74) *Attorney, Agent, or Firm* — Sughrue Mion, PLLC (57) ABSTRACT

Disclosed is a method for updating a flow table for a switch in software defined networking (SDN). The method for updating a flow table of at least one network device by a controller in a software defined network comprises the steps of: transmitting, to at least one network device, a flow table modification message including information on a scheduled time specifying a time at which updating of the flow table is performed; and receiving, from at least one network device, a result message showing an update result on the flow table performed by at least one network device according to the flow table modification message. Accordingly, it is possible to effectively control a load generated on the controller by controlling intervals of updating times between network devices, which is generated during transmission of the flow table modification message to multiple network devices.

18 Claims, 5 Drawing Sheets

(56) References Cited

U.S. PATENT DOCUMENTS

| | | | | |
|---|---|---|---|---|
| 2007/0263544 | A1* | 11/2007 | Yamanaka | H04L 45/12 370/238 |
| 2011/0058513 | A1* | 3/2011 | Ai | H04W 56/00 370/312 |
| 2012/0134361 | A1 | 5/2012 | Wong et al. | |
| 2012/0207024 | A1 | 8/2012 | Kohn et al. | |
| 2014/0328179 | A1* | 11/2014 | Kabakura | H04L 45/38 370/235 |
| 2016/0142340 | A1* | 5/2016 | Zhou | H04L 12/6418 370/401 |

OTHER PUBLICATIONS

Written Opinion of PCT/KR2014/008837, dated Jan. 8, 2015. [PCT/ISA/237].

\* cited by examiner

METHOD FOR UPDATING FLOW TABLE

CROSS REFERENCE TO RELATED APPLICATIONS

This application is a National Stage of International Application No. PCT/KR2014/008837 filed Sep. 23, 2014, claiming priorities based on Korean Patent Application Nos. 10-2013-0114764, filed Sep. 26, 2013 and 10-2014-0125933, filed Sep. 22, 2014, the contents of all of which are incorporated herein by reference in their entirety.

TECHNICAL FIELD

The present disclosure relates to a Software Defined Networking (SDN) technology, and more particularly to methods of updating a flow table for a switch apparatus.

BACKGROUND ART

Currently, standardization on technologies for efficiently operating a communication system by separating a traffic forwarding function and a control function of a switch apparatus is going on in an Open Networking Foundation (ONF), an Internet Engineering Task Force (IETF), a European Telecommunications Standards Institute (ETSI) ISG Network Function Virtualization (NFV), and an International Telecommunications Union Telecommunication (ITU-T).

Software-defined networking (SDN) means a user-oriented network in which a user has control authority regardless of a basic network device such as a router or a switch, etc. and a separate software controller controls a flow of traffic.

OpenFlow is one variety of SDN technology and defines an interface connecting a hardware such as a router and a controller operating in a network operating system (OS), and is a protocol for separating a control plane for controlling how to transmit a data packet through a network from a physical network and interacting with a data plane for data transmission.

An extensibility working group in the ONF is leading a drafting task on an OpenFlow specification (OF 1.x), which is a proposal of recommendation for a SDN core standard. The OpenFlow standards define connection manners and message protocols between a switch and a controller in a section of OpenFlow channel, and specify that a Transport Layer Security (TLS) can be basically used for maintaining TCP connections, mutual authentication, and encryption.

Also, the OpenFlow standards recommend the use of 'OPF_ECHO_REQUEST' messages and 'OFP_ECHO_REPLY' messages for identifying liveness of a connection between a switch and a controller.

However, if flow entries transferred from a controller to switches are not applied simultaneously, services for them cannot be applied in a lump. Also, if even one flow entry among a plurality of flow entries needed for service application is not successfully transferred, a problem may occur in the service application.

DISCLOSURE

Technical Problem

The purpose of the present invention for resolving the above-described problem is to provide methods for updating a flow table of at least one network apparatus based on a scheduled time in a software defined network (SDN).

Technical Solution

In order to achieve the above-described purpose, a method for updating a flow table according to an aspect of the present invention, as a method for updating a flow table of at least one network apparatus by a controller in a software defined network (SDN), may comprise transmitting, to the at least one network apparatus, a flow table modification message including information on a scheduled time specifying a time at which updating of the flow table is performed; and receiving, from the at least one network apparatus, a result message showing an update result on the flow table performed by the at least one network apparatus according to the flow table modification message.

Here, the scheduled time may be configured differently for the at least one network apparatus.

Here, the scheduled time may be configured identically for one or more network apparatuses belonging to a predetermined group among the at least one network apparatus.

Here, the method may further comprise retransmitting the flow table modification message to the at least one network apparatus having transmitted the result message showing a negative update result on the flow table.

Also, the retransmitted flow table modification message may make the at least one network apparatus immediately perform the updating of the flow table without the scheduled time.

In order to achieve the above-described purpose, a method for updating a flow table according to another aspect of the present invention, as a method for updating a flow table by at least one network apparatus in a software defined network (SDN), may comprise receiving, from a controller, a flow table modification message including information on a scheduled time specifying a time at which updating of the flow table is performed; and performing the updating of the flow table at the scheduled time.

Here, the method may further comprise transmitting a result message showing an update result on the flow table to the controller.

Also, the update result may be a failure message indicating a failure of updating the flow table.

Also, the failure message may be transmitted to the controller when the scheduled time is later than an expiration time of a target flow entry included in the flow table.

Also, the method may further comprise re-receiving, from the controller, the flow table modification message corresponding to the failure message; and performing the updating of the flow table according to the re-received flow table modification message.

Also, the updating of the flow table may be performed immediately when the flow table modification message is re-received.

Here, the scheduled time may be configured differently for the at least one network apparatus.

Here, the scheduled time may be configured identically for one or more network apparatuses belonging to a predetermined group among the at least one network apparatus.

In order to achieve the above-described purpose, a method for controlling at least one network apparatus according to yet another aspect of the present invention may comprise transmitting, by a controller, an operation message including information on a scheduled time specifying a time at which an operation corresponding to the operation message is performed, to the at least one network apparatus; and receiving, by the at least one network apparatus, the operation message, and performing the operation corresponding to the operation message.

Here, the operation message may be a flow table modification message for updating a flow table of the at least one network apparatus.

Here, the method may further comprise transmitting, by the at least one network apparatus, a result message showing a result of the operation corresponding to the operation message to the controller.

Here, the method may further comprise, when the result message is a failure message indicating a failure of updating the flow table, retransmitting, by the controller, the flow table modification message to the at least one network apparatus having transmitted the failure message.

Here, the updating of the flow table may be performed by the at least one network apparatus having transmitted the failure message immediately when the flow table modification message is re-received.

Advantageous Effects

According to the above-described exemplary embodiments of the present disclosure, interval times between updates in a plurality of network apparatuses, which can occur when a large number of flow table modification messages are transmitted to the plurality of network apparatuses, can be efficiently controlled by separating a time at which the flow table modification message is transferred and a time at which actual updating of the flow table is performed.

Also, since flow table modification messages do not have to be transferred to the network apparatuses in real time, and can be transferred to the network apparatuses without restricting to time, a load generated in the controller can be efficiently controlled.

BEST MODE

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a 'controller' in the specification means a functional entity controlling related components (for example, switches, routers, etc.) in order to control flows of traffic.

Also, the controller is not restricted to a specific physical implementation or a specific implementation position. For example, the controller may mean a controller functional entity defined in ONF, IETF, ETSI, or ITU-T.

A 'network apparatus' in the specification means a functional entity performing traffic (or, packet) forwarding, switching, or routing. Accordingly, in the specification, the network apparatus may also be referred to as a 'switch' or 'router'.

For example, the network apparatus may mean a switch, a router, a switching element, a routing element, a forwarding element, etc, defined in ONF, IETF, ETSI, or ITU-T.

Hereinafter, embodiments of the present invention will be described in detail with reference to the appended drawings.

Figure 1:
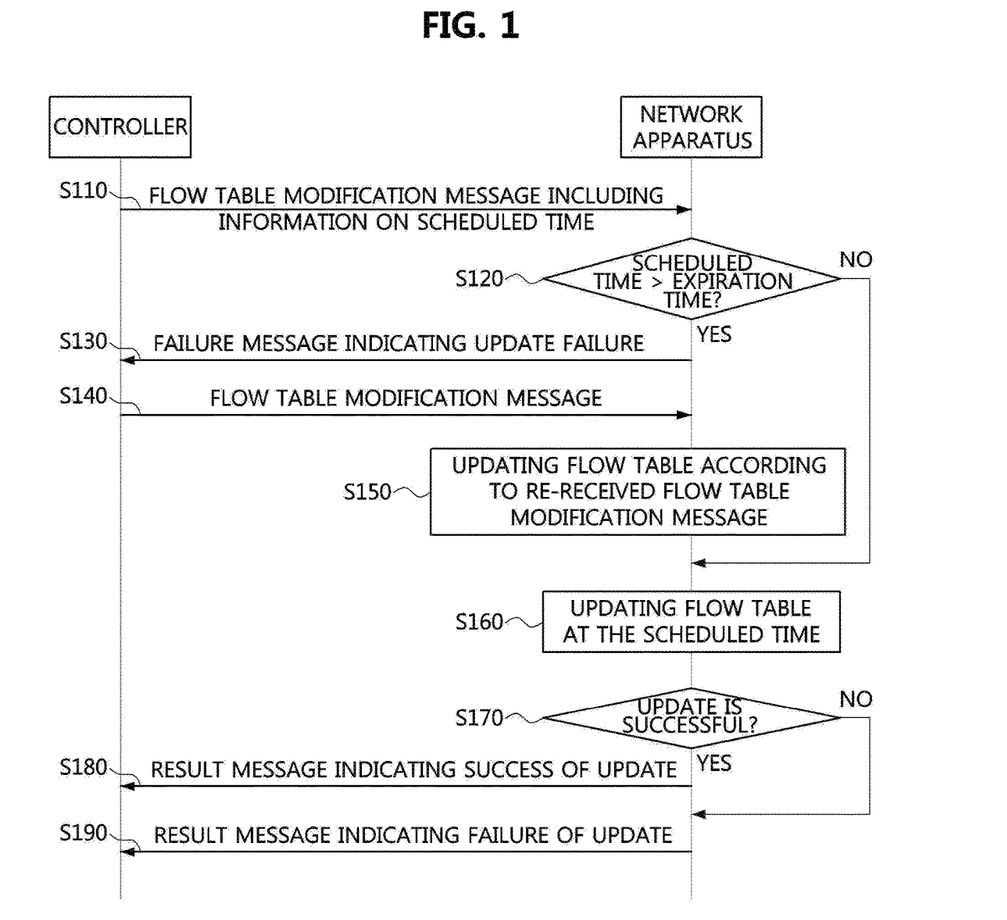
FIG. 1 is a sequence chart to explain a method for updating a flow table of a network apparatus according to an exemplary embodiment of the present disclosure.

FIG. 1 is a sequence chart to explain a method for updating a flow table of a network apparatus according to an exemplary embodiment of the present disclosure.

Referring to FIG. 1, a controller may transmit a flow table modification message for updating or modifying a flow table which a network apparatus has to the network apparatus. In this instance, the flow table modification message may include information on a scheduled (reservation) time specifying a time at which updating of the flow table is performed, and the network apparatus may perform the updating of the flow table at the scheduled time.

A method, in which the flow table of the network apparatus is updated based on the scheduled time, will be explained in detail as follows.

The controller may request the network apparatus to update the flow table which the network apparatus has by transmitting the flow table modification message including the information on a scheduled time specifying a time at which updating of the flow table is performed to the network apparatus (S110).

Here, the network apparatus may determine whether the scheduled time is earlier than an expiration time of a target flow entry in the flow table or not by using the information on the scheduled time included in the flow table modification message (S120). For example, the expiration time may be represented as 'idle timeout' or 'hard timeout' specified in the OpenFlow standard. That is, the expiration time may mean a time at which the target flow entry is expired or deleted in the flow table.

If the scheduled time is later than the expiration time (i.e. the scheduled time>the expiration time), since the flow entry is expired or deleted at the expiration time, the updating of the flow table cannot be performed at the scheduled time successfully. For example, when (the scheduled time—'hard timeout') is greater than 0, the flow table cannot be updated at the scheduled time.

If the scheduled time is later than the expiration time, the network apparatus may transmit a failure message indicating a failure of updating the flow table to the controller (S130).

The controller having received the failure message may retransmit the flow table modification message to the network apparatus having transmitted the failure message (S140), and the network apparatus re-receiving the flow table modification message may update the flow table according to the re-received flow table modification message (S150). Here, the network apparatus may perform the updating of the flow table immediately at the time of re-receiving the flow table modification message without waiting for any scheduled time. That is, the re-received flow table modification message may not have information on a scheduled time.

Meanwhile, if the scheduled time is earlier than the expiration time (i.e. the scheduled time<the expiration time), the network apparatus may update the flow table at the scheduled time (S160).

The network apparatus may identify whether the updating of the flow table has been performed successfully at the scheduled time (S170). The network apparatus may transmit a result message notifying an update result on the flow table to the controller, and the result message may be classified into a success message and a failure message.

When the update is performed successfully, the network apparatus may transmit the success message indicating success of the update to the controller (S180). However, the step S180 may be omitted. That is, since the step of transmitting success messages may increase load of the controller when there are too may network apparatuses under control of the controller, the step S180 may be optional.

When the update is failed, the network apparatus may transmit the failure message indicating failure of the update to the controller (S190). In the case that the failure message is transmitted to the controller, the above-described steps S140 and S150 may be performed.

According to an exemplary embodiment of the present disclosure, by separating a time at which the flow table modification message is transferred and a time at which actual updating of the flow table is performed, interval times between updates in a plurality of network apparatuses, which occur according to the large number of flow table modification messages transmitted to the plurality of network apparatuses, can be efficiently controlled.

Also, since flow table modification messages do not have to be transferred to the network apparatuses in real time and can be transferred to the network apparatuses without restricting to time, a load occurring in the controller can be efficiently controlled.

Meanwhile, the flow table modification message may be an example of various operation messages which the controller can transmit to the network apparatus in order to control the network apparatus.

Accordingly, without restricting to the flow table modification message, the controller may transmit various operating messages, each of which includes information on a scheduled time specifying a time at which an operation corresponding to each operation message is performed, to the network apparatus.

Also, upon receiving the operation message, the network apparatus may perform the operation corresponding to the operation message at the scheduled time.

Figure 2:
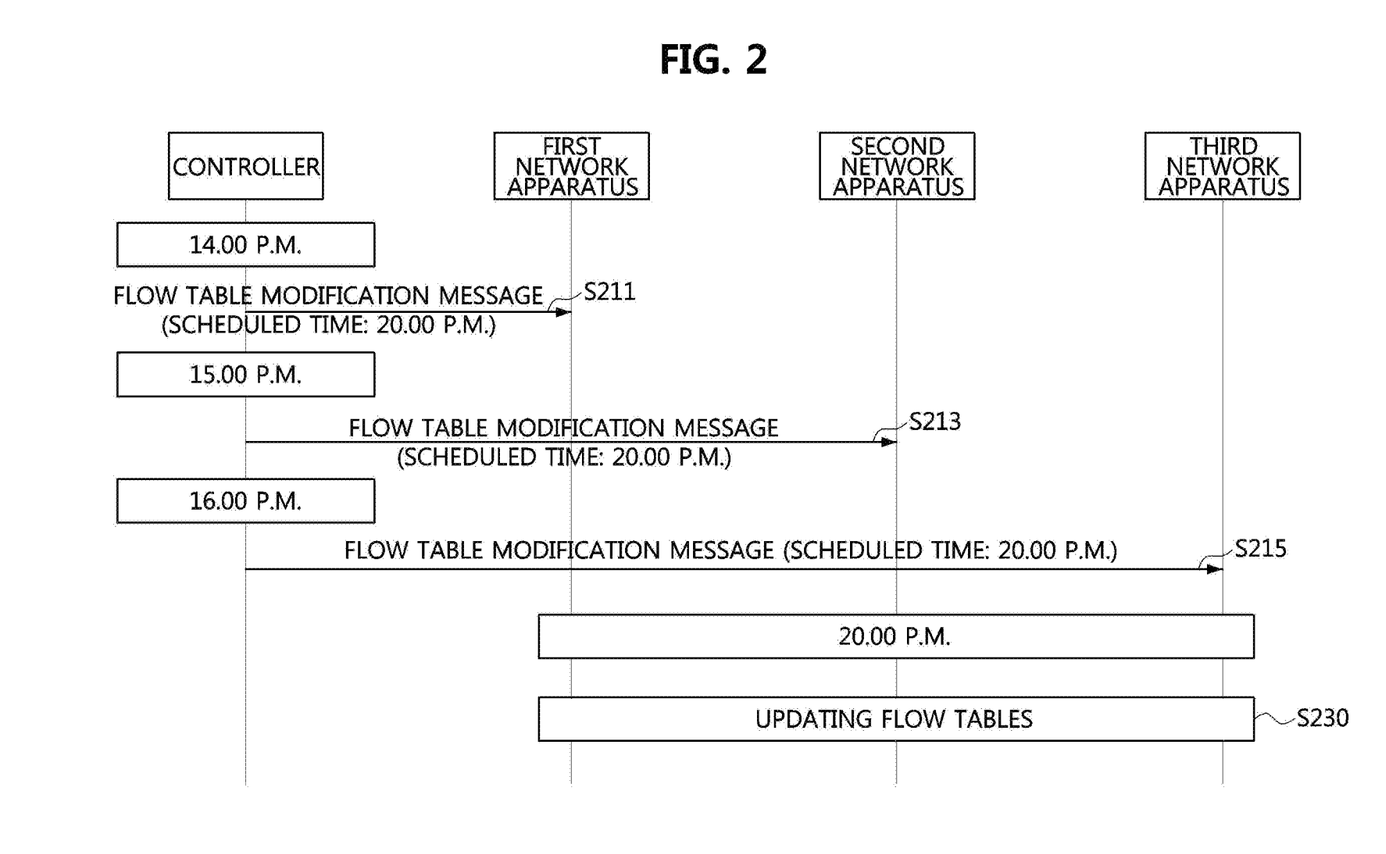
FIG. 2 is a sequence chart to explain a method for updating flow tables of a plurality of network apparatuses at the same time according to an exemplary embodiment of the present disclosure.

FIG. 2 is a sequence chart to explain a method for updating flow tables of a plurality of network apparatuses at the same time according to an exemplary embodiment of the present disclosure.

Referring to FIG. 2, a method, in which a controller transmits flow table modification messages to multiple network apparatuses at different times, and the flow table modification messages include information on the same scheduled time, will be explained.

The controller may transmit flow table modification messages to a plurality of network apparatuses in order to request the plurality of network apparatuses to update their flow tables.

For example, the controller may transmit a flow table modification message to a first network apparatus at 14.00 p.m. (S211), a flow table modification message to a second network apparatus at 15.00 p.m. (S213), and a flow table modification message to a third network apparatus at 16.00 p.m. (S215).

The information on the scheduled time included in the flow table modification message may be configured identically for the plurality of network apparatuses. For example, the scheduled time may be configured as 20.00 p.m.

The first network apparatus, the second network apparatus, and the third network apparatus may simultaneously perform updating of their flow tables at the scheduled time (i.e. 20.00 p.m.) (S230). Here, the first network apparatus, the second network apparatus, and the third network apparatus may be network apparatuses belonging to a predetermined group.

Accordingly, in an exemplary embodiment illustrated in FIG. 2, the controller may distribute its load by transmitting flow table modification messages to multiple network apparatuses at different times. For example, the controller may transmit the flow table modification messages to the network apparatuses when the load of the controller is the smallest, network congestion does not occur, or loads of the network apparatuses are the smallest.

Also, even though the controller transmits the flow table modification messages to the network apparatuses at different times, the network apparatus can be made to perform updating of the flow tables at the same scheduled time.

Figure 3:
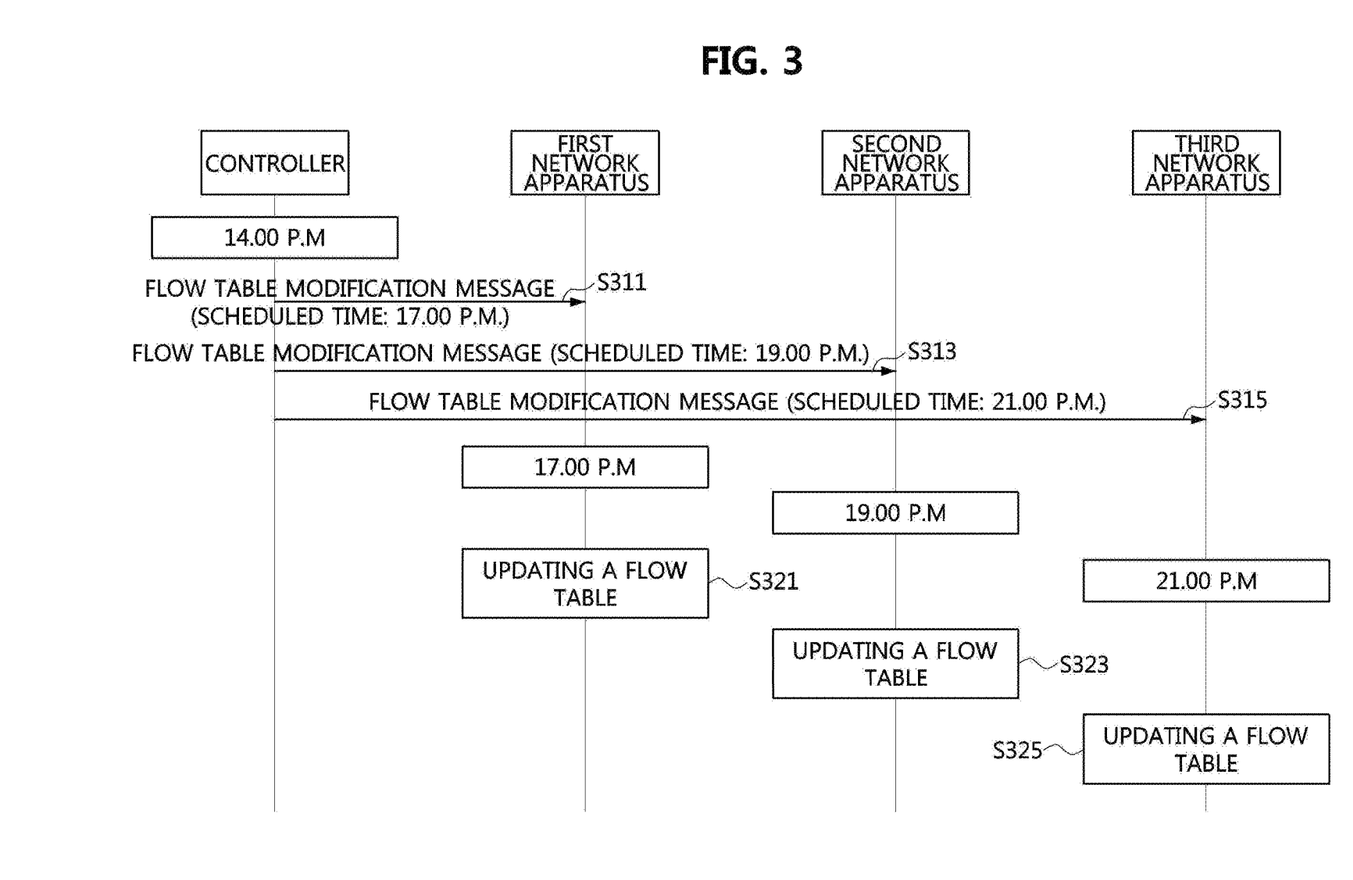
FIG. 3 is a sequence chart to explain a method for updating flow tables at different scheduled times according to an exemplary embodiment of the present disclosure.
Figure 4:
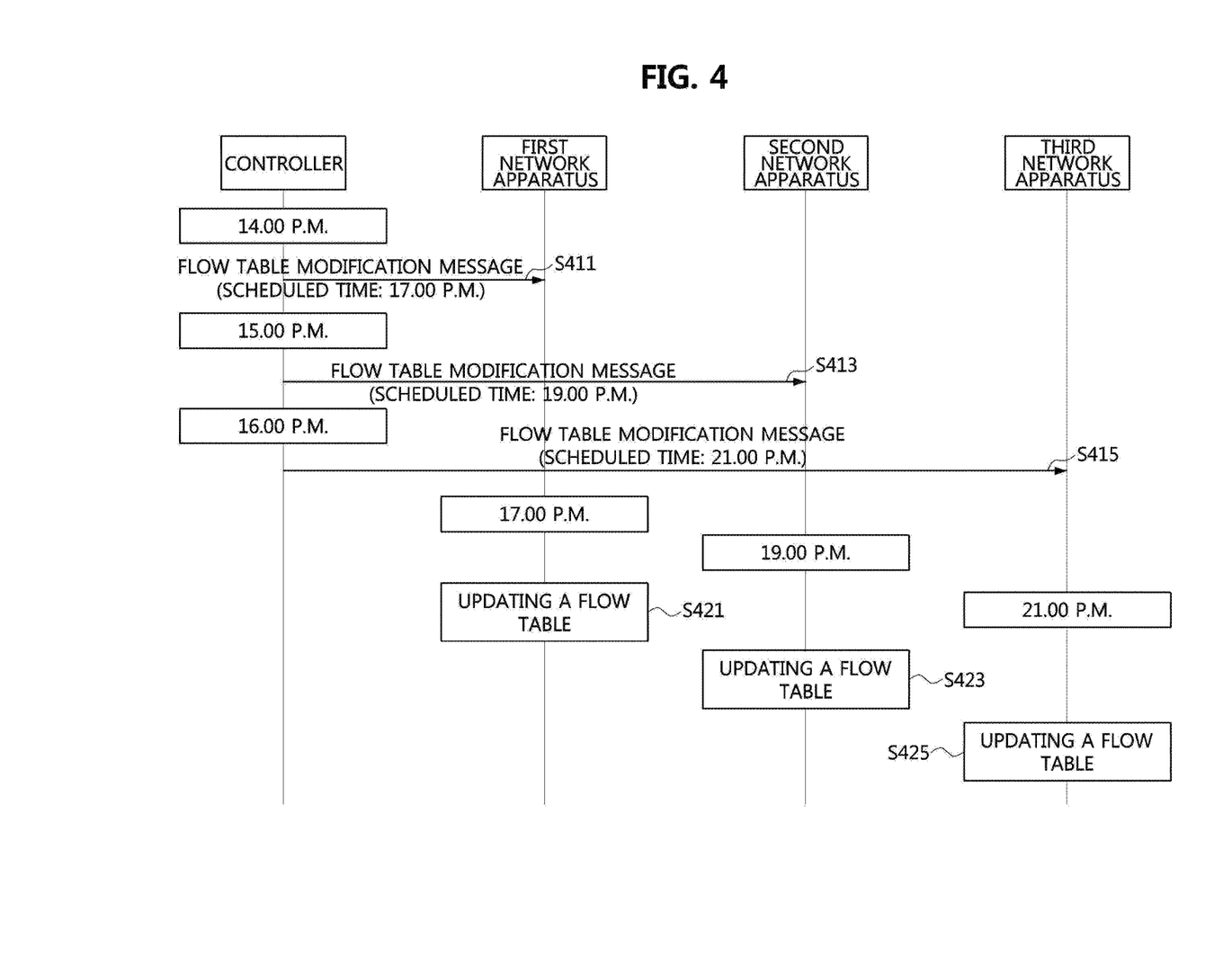
FIG. 4 is a sequence chart to explain a method for updating flow tables at different scheduled times according to another exemplary embodiment of the present disclosure.

FIG. 3 is a sequence chart to explain a method for updating flow tables at different scheduled times according to an exemplary embodiment of the present disclosure, and FIG. 4 is a sequence chart to explain a method for updating flow tables at different scheduled times according to another exemplary embodiment of the present disclosure.

First, referring to FIG. 3, a method in which a controller transmits flow table modification messages to multiple network apparatuses at the same time, and each of the network apparatuses actually updates its flow table at different scheduled time, will be explained.

The controller may simultaneously transmit flow table modification messages to a first network apparatus, a second network apparatus, and a third network apparatus at 14.00 p.m. (S311, S313, S315).

Here, the scheduled time for the flow table modification message transmitted to the first network apparatus may be configured as 17.00 p.m., the scheduled time for the flow table modification message transmitted to the second network apparatus may be configured as 19.00 p.m., and the scheduled time for the flow table modification message transmitted to the third network apparatus may be configured as 21.00 p.m.

Each of the first, second, and third network apparatuses may perform updating of its flow table at the scheduled time configured in the received flow table modification message.

For example, the first network apparatus may perform updating of its flow table at 17.00 p.m. (S321), the second network apparatus may perform updating of its flow table at 19.00 p.m. (S323), and the third network apparatus may perform updating of its flow table at 21.00 p.m. (S325).

Next, referring to FIG. 4, a method in which a controller transmits flow table modification messages to multiple network apparatuses at different times, and each of the network apparatuses actually updates its flow table at different scheduled time, will be explained.

The controller may transmit a flow table modification message to a first network apparatus at 14.00 p.m. (S411), a flow table modification message to a second network apparatus at 15.00 p.m. (S413), and a flow table modification message to a third network apparatus at 16.00 p.m. (S415).

Here, the scheduled time for the flow table modification message transmitted to the first network apparatus may be configured as 17.00 p.m., the scheduled time for the flow table modification message transmitted to the second network apparatus may be configured as 19.00 p.m., and the scheduled time for the flow table modification message transmitted to the third network apparatus may be configured as 21.00 p.m.

Each of the first, second, and third network apparatuses may perform updating of its flow table at the scheduled time configured in the received flow table modification message.

For example, the first network apparatus may perform updating of its flow table at 17.00 p.m. (S421), the second network apparatus may perform updating of its flow table at 19.00 p.m. (S423), and the third network apparatus may perform updating of its flow table at 21.00 p.m. (S425).

By including information on a scheduled time in a flow table modification message for updating a flow table, as explained in the exemplary embodiments of FIG. 3 and FIG. 4, transmission times of flow table modification messages and actual update times for flow tales can be configured variously such that the flow tables of multiple network apparatuses can be efficiently updated.

Figure 5:
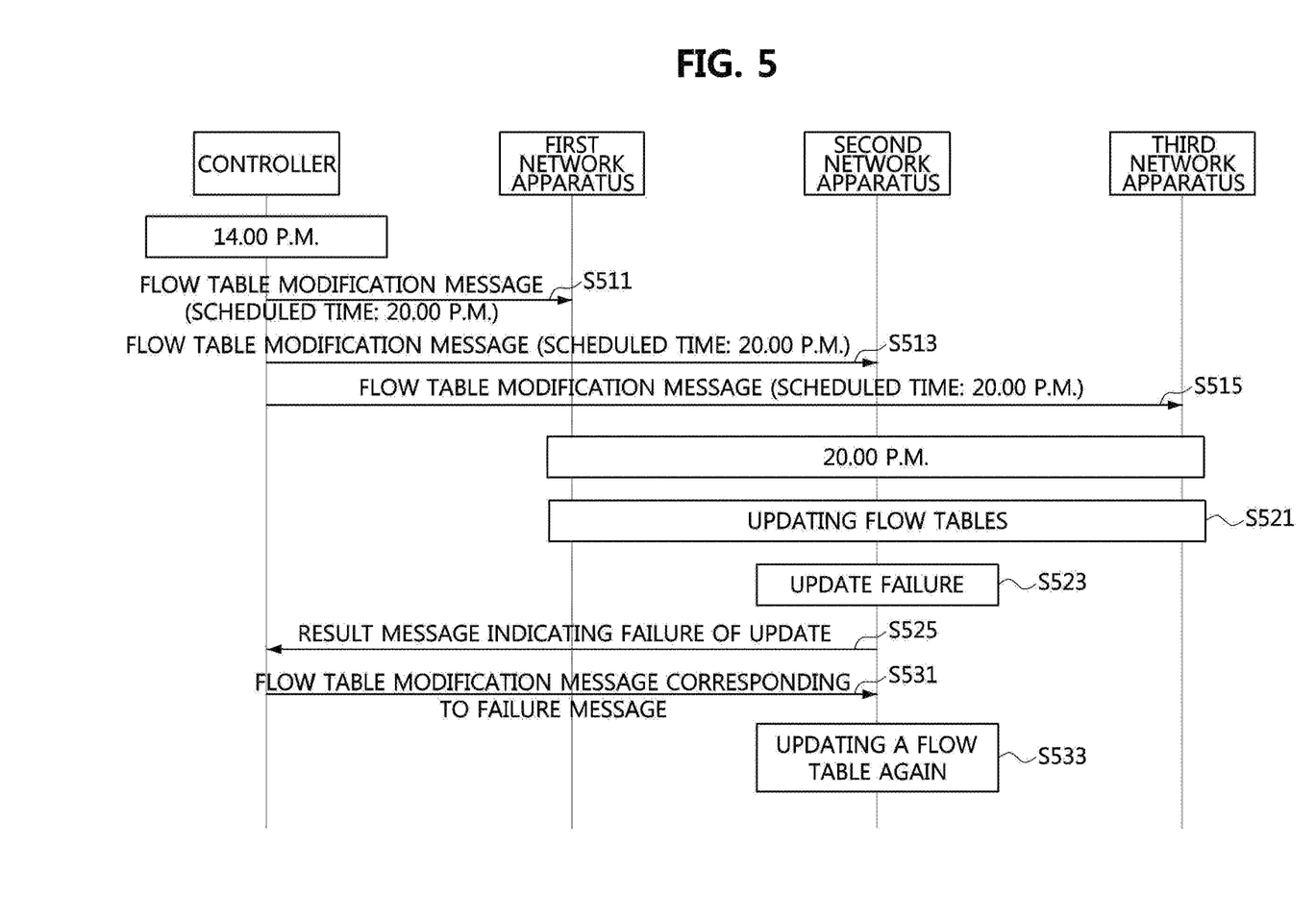
FIG. 5 is a sequence chart to explain a method for processing a case in which a scheduled time based update on a flow table fails, according to an exemplary embodiment of the present disclosure.

FIG. 5 is a sequence chart to explain a method for processing a case in which a scheduled time based update on a flow table fails, according to an exemplary embodiment of the present disclosure.

Referring to FIG. 5, a method, in which a network apparatus performs updating of its flow fable according to a scheduled time of a flow table modification message transferred from a controller, but the updating of the flow table fails, will be explained.

The controller may simultaneously transmit flow table modification messages to a first network apparatus, a second network apparatus, and a third network apparatus at 14.00 p.m. (S511, S513, S515).

Here, the information on scheduled times included in the flow table modification messages may be configured identically for the network apparatuses. For example, the scheduled times for the network apparatuses may be configured as 20.00 p.m.

After receiving the flow table modification messages, the first, second, and third network apparatuses may simultaneously perform updating of their flow tables at the scheduled time (i.e. 20.00 p.m.) (S521).

Among the first, second, and third network apparatuses, a network apparatus which fails updating of its flow table may exist.

For example, a case in which the second network apparatus fails updating of its flow table will be explained.

After the second network apparatus receives the flow table modification message whose scheduled time is configured as 20.00 p.m. (S513), the second network apparatus tries to update its flow table according to the flow table message at 20.00 p.m. (S521), but the second network apparatus may fail updating of the flow table (S523).

In this case, the second network apparatus may transmit a failure message indicating failure of updating of its flow table to the controller (S525).

The controller having receiving the failure message may retransmit the flow table modification message to the second network apparatus having transmitted the failure message (S531), and the second network apparatus re-receiving the flow table modification message may update its flow table according to the re-received flow table modification message (S533). Here, the re-received flow table modification message may make the second network apparatus perform updating of the flow table immediately when the second network apparatus re-receives the flow table modification message. That is, the re-received flow table modification message may not include information on a scheduled time, and make the receiving network apparatus perform its operation immediately without any scheduled time.

Also, although the scheduled times for the plurality of network apparatuses are configured identically in the exemplary embodiment of FIG. 5, the scheduled times for the plurality of network apparatuses may be configured differently even for the exemplary embodiment of FIG. 5.

According to the exemplary embodiments of the present disclosure, interval times between updates in a plurality of network apparatuses, which occur according to a large number of flow table modification messages transmitted to the plurality of network apparatuses, can be efficiently controlled.

While the example embodiments of the present invention and their advantages have been described in detail, it should be understood that various changes, substitutions and alterations may be made herein without departing from the scope of the invention.

The invention claimed is:

1. A method for updating a flow table of at least one network apparatus by a controller in a software defined network (SDN), the method comprising:
   transmitting, to the at least one network apparatus, a flow table modification message including information on a scheduled time specifying a time at which updating of the flow table is performed; and
   receiving, from the at least one network apparatus, a result message showing an update result on the flow table performed by the at least one network apparatus according to the flow table modification message,
   wherein a failure message is received by the controller when the scheduled time is later than an expiration time of a target flow entry included in the flow table.

2. The method according to claim 1, wherein the scheduled time is configured differently for the at least one network apparatus.

3. The method according to claim 1, wherein the scheduled time is configured identically for one or more network apparatuses belonging to a predetermined group among the at least one network apparatus.

4. The method according to claim 1, further comprising retransmitting the flow table modification message to the at least one network apparatus having transmitted the result message showing a negative update result on the flow table.

5. The method according to claim 4, wherein the retransmitted flow table modification message makes the at least one network apparatus immediately perform the updating of the flow table without the scheduled time.

6. The method according to claim 1, wherein the scheduled time for the at least one network apparatus is different from a scheduled time for another network apparatus.

7. A method for updating a flow table by at least one network apparatus in a software defined network (SDN), the method comprising:
   receiving, from a controller, a flow table modification message including information on a scheduled time specifying a time at which updating of the flow table is performed; and
   performing the updating of the flow table at the scheduled time,
   wherein a failure message is transmitted to the controller when the scheduled time is later than an expiration time of a target flow entry included in the flow table.

8. The method according to claim 7, further comprising transmitting a result message showing an update result on the flow table to the controller.

9. The method according to claim 8, wherein the update result is the failure message indicating a failure of updating the flow table.

10. The method according to claim 9, further comprising:
    re-receiving, from the controller, the flow table modification message corresponding to the failure message; and
    performing the updating of the flow table according to the re-received flow table modification message.

11. The method according to claim 10, wherein the updating of the flow table is performed immediately when the flow table modification message is re-received.

12. The method according to claim 7, wherein the scheduled time is configured differently for the at least one network apparatus.

13. The method according to claim 7, wherein the scheduled time is configured identically for one or more network apparatuses belonging to a predetermined group among the at least one network apparatus.

14. A method for controlling at least one network apparatus in a software defined network (SDN), the method comprising:
    transmitting, by a controller, an operation message including information on a scheduled time specifying a time at which an operation corresponding to the operation message is performed, to the at least one network apparatus; and
    receiving, by the at least one network apparatus, the operation message, and performing the operation corresponding to the operation message,
    wherein a failure message is received by the controller when the scheduled time is later than an expiration time of a target flow entry corresponding to the operation.

15. The method according to claim 14, wherein the operation message is a flow table modification message for updating a flow table of the at least one network apparatus.

16. The method according to claim 15, further comprising transmitting, by the at least one network apparatus, a result message showing a result of the operation corresponding to the operation message to the controller.

17. The method according to claim 16, further comprising, when the result message is a failure message indicating a failure of updating the flow table, retransmitting, by the controller, a flow table modification message to the at least one network apparatus having transmitted the failure message.

18. The method according to claim 17, wherein the updating of the flow table is performed by the at least one network apparatus having transmitted the failure message immediately when the flow table modification message is re-received.

* * * * *